(12) United States Patent
Reiman

(10) Patent No.: US 6,418,879 B1
(45) Date of Patent: Jul. 16, 2002

(54) BIRD TRAINING APPARATUS AND METHOD

(76) Inventor: Roy J. Reiman, 5350 S. 60th St., Greendale, WI (US) 53129

( * ) Notice: Subject to any disclaimer, the term of this patent is extended or adjusted under 35 U.S.C. 154(b) by 0 days.

(21) Appl. No.: 09/566,180

(22) Filed: May 5, 2000

(51) Int. Cl.[7] .......................... A01K 61/02; A01K 29/00
(52) U.S. Cl. ........................ 119/61; 119/57.8; 119/52.3
(58) Field of Search .............................. 119/52.01, 52.3, 119/57.8, 61; D30/124, 125; D20/29, 31, 32, 33

(56) References Cited

U.S. PATENT DOCUMENTS

| | | | | |
|---|---|---|---|---|
| D221,959 S | * | 9/1971 | Liftman | D20/33 |
| D310,109 S | * | 8/1990 | Vega | D20/32 |
| 5,134,968 A | * | 8/1992 | Yancy | 119/57.8 |
| 5,746,154 A | * | 5/1998 | Millet et al. | 119/57.8 |
| 5,947,054 A | * | 9/1999 | Liethen | 119/52.3 |
| 6,050,221 A | * | 4/2000 | Eaton et al. | 119/52.3 |
| D434,081 S | * | 11/2000 | Gruber | D20/31 |

* cited by examiner

Primary Examiner—Charles T. Jordan
Assistant Examiner—Elizabeth Shaw
(74) Attorney, Agent, or Firm—Quarles & Brady LLP

(57) ABSTRACT

A method and apparatus for training birds to retrieve food from a user's hand without requiring the user to stand motionless for long periods over the course of many days. The apparatus is a bird feeding trainer including a stand up display for supporting an article of clothing, and an arm extending from the display. A horizontal presentment platform mounted to a distal end of the arm can hold food for presentment to an animal. Birds are trained to retrieve food from the presentment platform, as a precursor to retrieving food from a users hand.

12 Claims, 4 Drawing Sheets

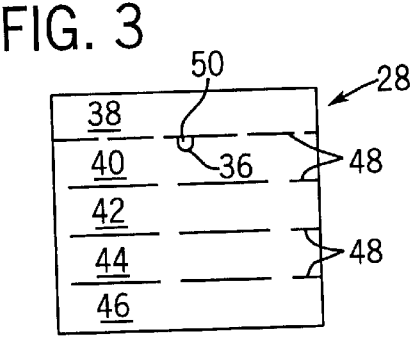
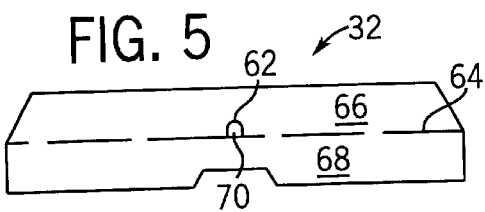
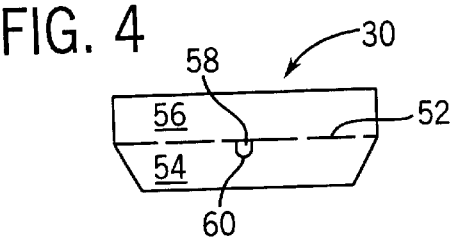
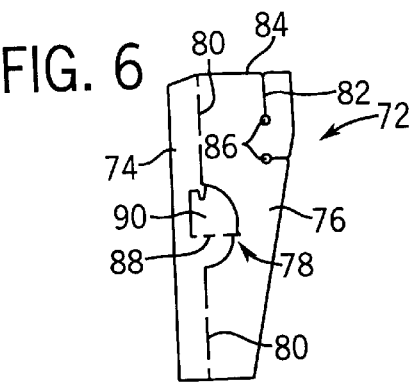
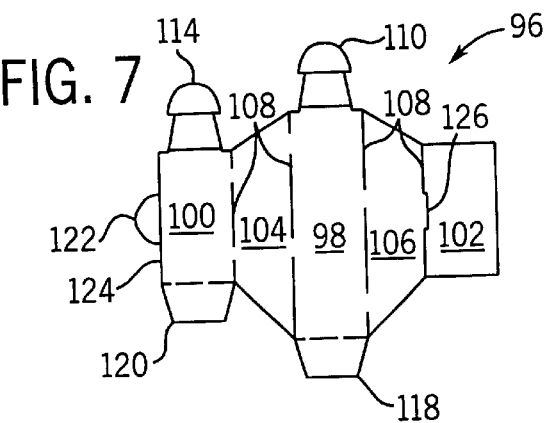
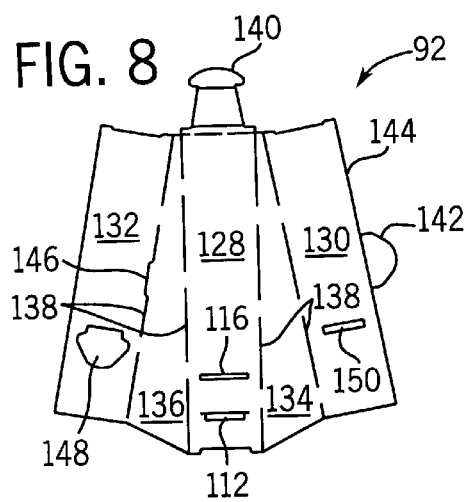
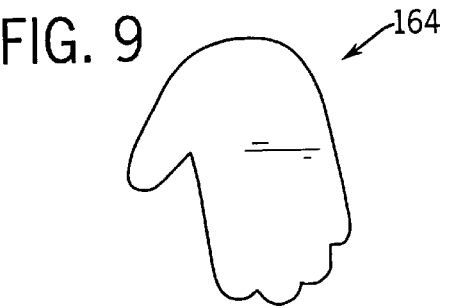
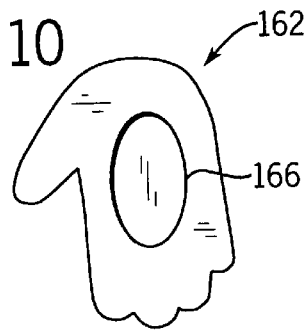

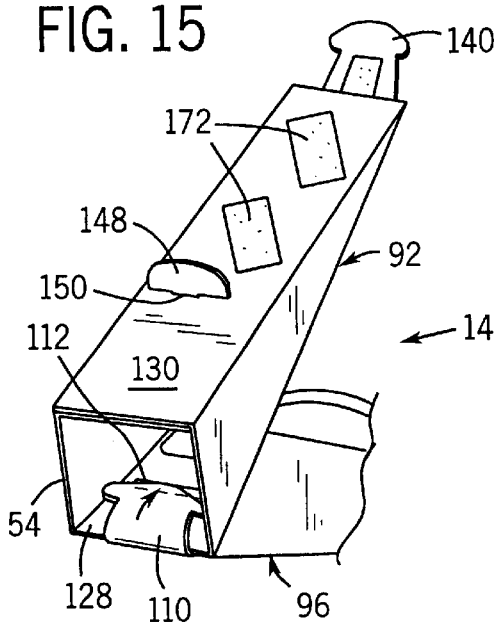
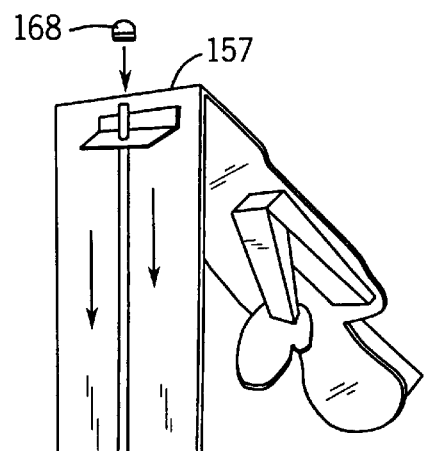
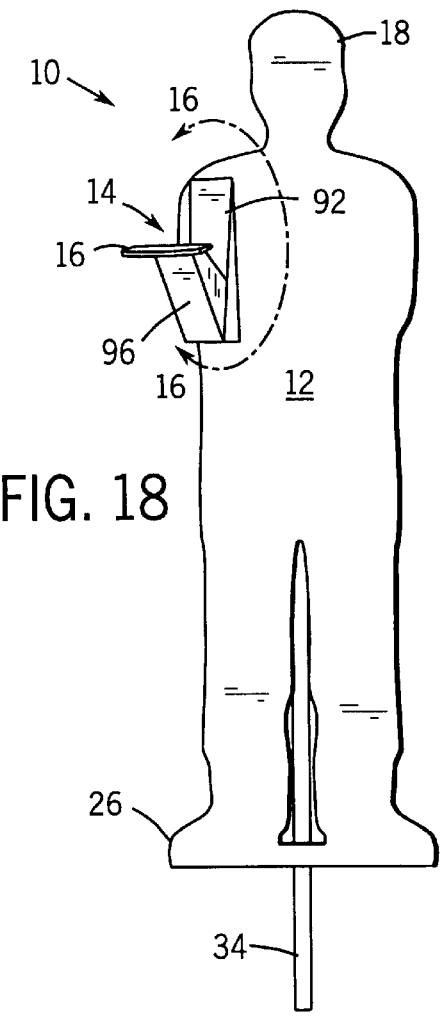
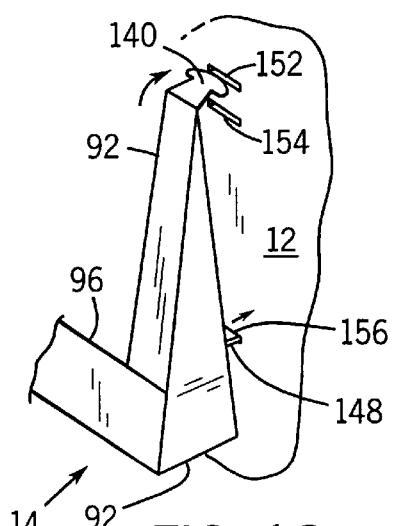

US 6,418,879 B1

BIRD TRAINING APPARATUS AND METHOD

CROSS-REFERENCE TO RELATED APPLICATION

Not Applicable

STATEMENT REGARDING GOVERNMENT SPONSORED RESEARCH OR DEVELOPMENT

Not Applicable.

BACKGROUND OF THE INVENTION

1. Field of the Invention

This invention relates to bird feeding, in particular a method and apparatus for training non-domesticated birds to accept bird feed from a hand of a person.

2. Discussion of the Prior Art

Bird feeding is a popular activity which attracts wild birds, such as chickadees, nuthatches, and the like, in viewing range for the enjoyment of the individuals providing the bird food and others. Typically, birds are fed from a bird feeder comprised of a container containing a large quantity of food, such as bird seed, and the birds swoop down on the bird feeder to retrieve the seed. Individuals watching the activity remain a distance away from the feeder to avoid scaring the birds away.

Certain individuals, however, prefer to become more involved in the bird feeding activity, by training the birds to retrieve food directly from the individual's hand. Typically, to train a bird to eat from a human hand, an individual must first determine the normal feeding pattern for birds feeding from a bird feeder. Then on the first day of training, the individual stands very still about 20 feet from the bird feeder, while the birds are retrieving food from the feeder. Each day thereafter, the individual moves closer and closer to the feeder, until the individual is right next to the feeder, and the birds continue to retrieve food from the feeder.

When the individual feels that the time is right, the bird feeder is emptied, covered, or removed from the area during the normal feeding period, the individual holds a tray or plate containing bird food. After a period of time, the birds should retrieve food from the tray. Once the birds are comfortable retrieving food from the tray, the individual places the bird food directly in their hand, and the birds should retrieve the food directly from the individual's hand. This prior art method is very time consuming, and requires the individual to stand motionless for long periods of time.

BRIEF SUMMARY OF THE INVENTION

The present invention provides a method and apparatus for training birds to retrieve food from a user's hand without requiting the user to stand motionless for long periods over the course of many days. The apparatus is a bird feeding trainer including a stand up display for supporting an article of clothing, and an arm extending from the display. A horizontal presentment platform mounted to a distal end of the arm can hold food for presentment to an animal.

The birds are trained using the apparatus to eat out of a hand of a user by presenting food for a bird in the bird feeding trainer having an article of clothing attached thereto until the birds regularly accepts feed from the trainer. The user takes the place of the trainer by removing the article of clothing from the trainer, and putting on the clothes, and presenting food for the birds in the user's hand.

A general objective of the present invention is to train birds to eat out of a user's hand without requiring standing motionless for long periods of time over the course of many days. This objective is accomplished by providing a bird feeding trainer and method which trains birds to retrieve food from the trainer as a precursor to retrieving bird food from the user's hand.

Another objective of the present invention is to provide a trainer which can easily be shipped to a user. This objective is accomplished by providing a bird feeding trainer formed from a sheet material which can be shipped in an unassembled configuration.

The foregoing and other advantages of the invention will appear from the following description. In this description, reference is made to the accompanying drawings which form a part hereof and in which there is shown by way of illustration preferred embodiments of the invention. These embodiments do not represent the full scope of the invention. Thus, the claims should be looked to in order to judge the scope of the invention.

BRIEF DESCRIPTION OF THE DRAWINGS

FIG. 3 is a plan view of a blank for making a top cross member of FIG. 1;

FIG. 4 is a plan view of a blank for making a middle cross member of FIG. 1;

FIG. 5 is a plan view of a blank for making a bottom cross member of FIG. 1;

FIG. 6 is a plan view of a blank for making a head support of FIG. 1;

FIG. 7 is a plan view of a blank for making a fore arm of FIG. 1;

FIG. 8 is a plan view of a blank for making an upper arm of FIG. 1;

FIG. 9 is a plan view of a blank for making a lower member of the presentment platform of FIG. 1;

FIG. 10 is a plan view of a blank for making an upper member of the presentment platform of FIG. 1;

FIG. 15 is a bottom perspective view of an assembled arm of FIG. 1;

FIG. 16 is a perspective detail view of an arm partially attached to the display along line 16—16 of FIG. 18;

FIG. 17 is a perspective view of a support partially engaging the display of FIG. 1;

FIG. 18 is an assembled trainer of FIG. 1 without clothes; and

DETAILED DESCRIPTION OF THE PREFERRED EMBODIMENTS

A bird feeding trainer 10 of the invention as shown in FIGS. 1–18 is made from a stand-up display 12 having a human profile, and an arm 14 extending from the stand-up display 12. The arm 14 supports a presentment platform 16 for presenting bird food, such as seeds, to wild birds. The trainer 10 trains the birds to accept bird food from the presentment platform 16 as a precursor to accepting bird food from a human hand.

Figure 2:
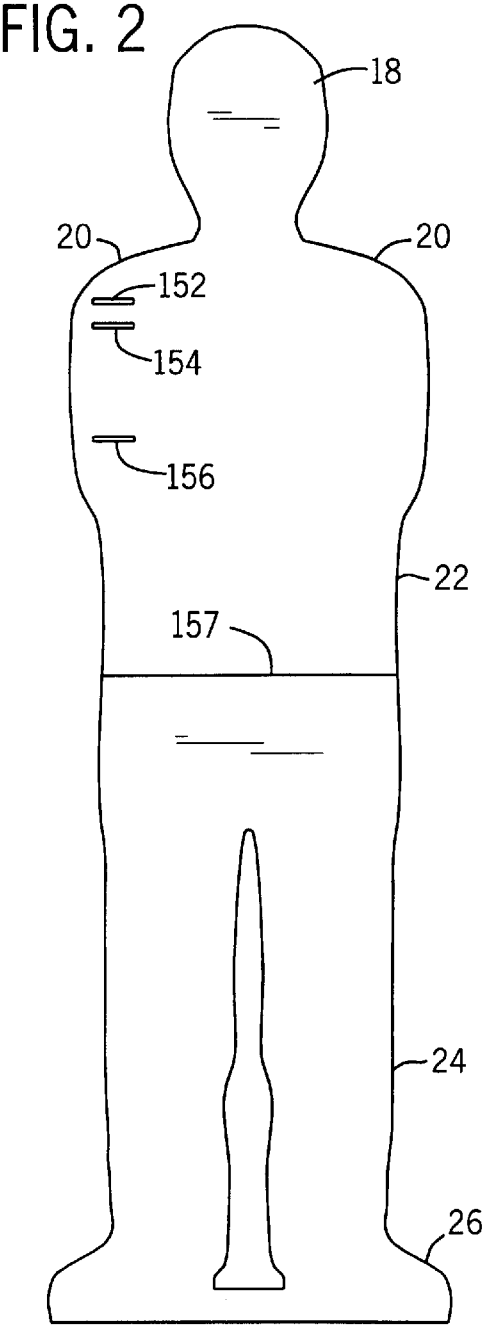
FIG. 2 is a plan view of a blank for making the stand-up display of FIG. 1.

Referring to FIG. 2, the stand-up display 12 is formed from a sheet of rigid material which can support the arm 14 and an article of clothing wrapped around the display. Preferably, the rigid material is a water resistant plastic sheet, such as Coroplast™, available from Coroplast, Inc. of Dallas, Tex., having a thickness of approximately 4 mm. Although a sheet of rigid material is preferred to provide a stand-up display 12 which can be folded, shipped, and easily moved, the display 12 can be formed from any material which can support an arm 14 and an article of clothing without departing from the scope of the present invention.

In the embodiment shown in FIG. 2, the display 12 has a front and a back, and is cut out from the sheet material in a front facing profile shape of a human having a head 18, shoulders 20, waist 22, legs 24, and feet 26. An image of a human face can be applied to the front of the head 18, such as by printing, to desensitize the birds to the features of a human face. Slots 152, 154, 156 are formed in the display for mounting the arm 14 thereto. A horizontal crease 157 formed proximal the display waist 22 is provided to fold the display 12 in half and simplify shipping.

Figure 1:
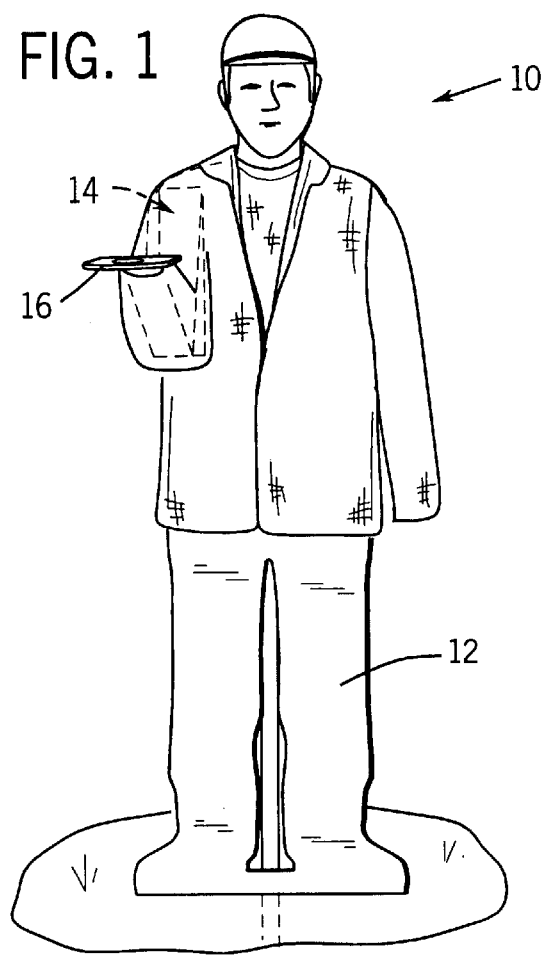
FIG. 1 is a front perspective view of a bird feeding trainer incorporating the present invention.

Referring to FIGS. 3–5 and 11, three cross members 28, 30, 32 attached to the panel back proximal the shoulders 20, waist 22, and feet 26, respectively, extend horizontally across the display, and engage a support 34 which supports the display 12 in a standing position (shown in FIGS. 1 and 18). Preferably, the cross members 28, 30, 32 are cut out from a rigid sheet material, such as a 2 mm thick Coroplast™ sheet The cross members 28, 30, 32 are attached to the display 12 using methods known in the art, such as an adhesive, staples, and the like.

Figure 11:
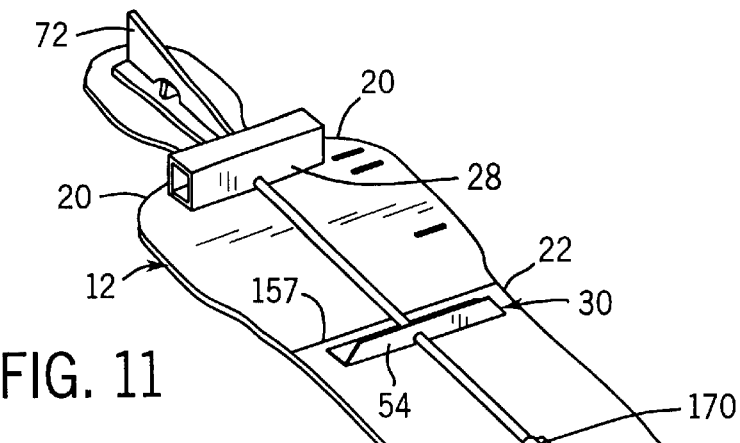
FIG. 11 is a perspective view of a partially assembled stand-up display of FIG. 1.

Looking particularly at FIGS. 3 and 11, the top cross member 28 is an open-ended rectangular box joined to the display proximal the shoulders 20. The top cross member 28 is formed from a cut out having five elongated rectangular panels 38, 40, 42, 44, 46, including opposing side panels 38, 46. Creases 48 define the edges of adjacent panels.

An aperture 36 is formed in the panel 40 of the cross member 28 for engaging the support 34. A tab 50 centrally formed in the inner panel 40, and having an edge colinear with the crease 48 defining an edge of side panel 38, folds away from the inner panel 40 to form the aperture 36.

The top cross 28 member is assembled by folding the panels 38, 40, 42, 44, 46 at the creases 48 to place the side panels 38, 46 in an overlapping relation. The side panels 38, 46 are joined using methods known in the art, such as an adhesive, staples, and the like, and the outwardly facing side panel 28 or 46 is similarly joined to the display 10. When joining the top cross member 28 to the display 12, the panel 40 having the tab 50 is positioned facing downwardly such that the aperture 36 is adjacent the display 12 when the tab 50 is folded away from the panel 40.

Referring to FIGS. 4 and 11, the middle cross member 30 is an elongated strip of sheet material joined to the display 12 proximal the display waist 22. The middle cross member strip includes a longitudinal crease 52 for folding a portion of the cross member 30 substantially perpendicular to the display 12. Preferably, the middle cross member 30 is formed from a cut out having two elongated panels 54, 56. The crease 52 defines the common edge of the adjacent panels 54, 56, and the panel 54 is the folded portion.

A tab 58 is centrally formed in the folded panel 54, and has an edge colinear with the crease 52. The tab 58 folds away from the panel 54 to form an aperture 60 for engaging the support 30. The panel 56 not having the tab 58 is joined to the display 12 using methods known in the art, such as disclosed above. The middle cross member 30 is positioned on the display 12, such the aperture 60 is colinear with the aperture 36 formed in the top cross member 28 and an aperture 62 formed in the bottom cross member 32.

Referring to FIGS. 5 and 11, the bottom cross member 32 is an elongated strip of sheet material joined to the display 12 proximal the display feet 26. The bottom cross member strip includes a longitudinal crease 64 for folding a portion of the cross member 32 substantially perpendicular to the display 12. Preferably, the bottom cross member 32 is formed from a cut out having two elongated panels 66, 68. The crease 64 defines the common edge of adjacent panels 66, 68, and the panel 66 is the folded portion.

A tab 70 formed in the folded panel 66 has an edge colinear with the crease 62, and folds away from the panel 66 to form the aperture 62. The panel 68 not having the tab 70 is joined to the display 12 using methods known in the art, such as described above. The bottom cross member 32 is positioned on the display 12, such that the aperture 62 is colinear with the aperture 36 formed in the top cross member 28 and the aperture 60 formed in the middle cross member 30.

Referring to FIGS. 6 and 11, a vertical head support 72 is attached to the back of the display head 18, and supports the head 18 and a cap placed on the head 18. Preferably, the head support 72 is cut out from a rigid sheet material, such as a 2 mm thick Coroplast™ sheet, and includes an attachment panel 74, a support panel 76, and a bracing tab 78. A crease 80 defines the common edge of adjacent panels 74, 76.

The attachment panel 74 is substantially rectangular, and is attached to the display head 18 back using methods known in the art, such as disclosed above. The support panel 76 folds away from the attachment panel 74 at the crease 80 to provide a vertical support spaced from the panel head 18 back. Preferably, a vertical slot 82 is formed in the support panel 74 extending from the support top edge 84 for receiving a portion of a cap, such as a cap adjustable strap, to retain the cap on the head 18. Holes 86 formed in the support panel 76 provide attachment points for string or wire to tie the cap to the support panel 76.

The bracing tab 78 is formed as an integral part of the attachment panel 74, and is cut out of the support panel 76. A tab crease 88 is formed in the tab to define a foldable locking portion 90. The locking portion 90 folds away from the attachment panel 74 at the tab crease 88, and engages the support panel 76 to lock the support panel 76 in a folded position perpendicular to the display 12.

Referring to FIGS. 7, 8, 12–15, the arm 14 is attached to the stand-up display 12, and includes an upper arm 92 having a distal end 94 and a fore arm 96 joined to the upper arm distal end 94. The upper arm 92 and fore arm 96 are preferably cut out from a rigid sheet material, such as a 2 mm thick Coroplast™ sheet, folded to form a rigid structure, and then joined to support the presentment platform 16. Although, an arm 14 formed from an upper arm 92 and fore arm 96 cut out from a rigid sheet material is preferred, any structure supporting the presentment platform 16 can be used without departing from the scope of the present invention.

Referring to FIG. 7, the fore arm 96 is formed from a cut out having five elongated panels 98, 100, 102, 104, 106. The panels 98, 100, 102, 104, 106 include a center panel 98 and two side panels 100, 102, each side panel 100, 102 is joined to an edge of the center panel 98 by an intermediate panel 104, 106. Creases 108 define the common edges of adjacent panels.

The fore arm 96 cut out shape includes tabs 110, 114, 122, slot 126, and flaps 118, 120 to join the fore arm 96 to the upper arm 92, and provides a rigid structure for supporting the presentment platform 16 when assembled. A lower connecting tab 110 extending from one end of the fore arm center panel 98 is received in a lower slot 112 formed in the upper arm 92 to attach the fore arm 96 to the upper arm 92. A first support flap 118 extends from the opposing end of the center panel 98 for supporting the presentment platform 16. An upper connecting tab 114 extending from one end of one side panel 100 is received in an upper slot 116 formed in the upper arm 92 to further secure the fore arm 96 to the upper arm 92. A second support flap 120 extends from the opposing end of side panel 100 for supporting the presentment platform 16. A locking tab 122 extending from an edge of side panel 100 is received in a slot 126 formed in the crease 108 defining an edge of the other side panel 102 between the other side panel 102 and adjacent intermediate panel 106.

Figure 13:
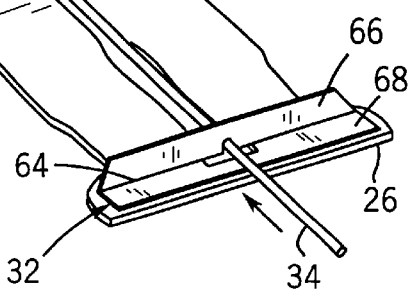
FIG. 13 is a perspective view of a partially assembled fore arm of FIG. 1.

Referring to FIG. 13, the fore arm 96 is assembled by folding the panels 98, 100, 102, 104, 106 at the creases 108 top lace the side panels 100, 102 in an overlapping relation. The locking tab 122 is inserted into the slot 126 to secure the side panels 100, 102 together to form the rigid structure. The support flaps 118, 120 are folded over in an overlapping relationship to provide a support surface for the presentment platform 16.

Referring to FIG. 8, the upper arm 92 is formed from a cut out having five elongated panels 128, 130, 132, 134, 136. The panels 128, 130, 132, 134, 136 include a center panel 128 and two side panels 130, 132, each side panel 130, 132 is joined to an edge of the center panel 128 by an intermediate panel 134, 136. Creases 138 define the edges of adjacent panels.

The upper arm 92 cut out shape includes tabs 140, 142, 148 and slots 112, 116, 150 to join the upper arm 92 to the forearm 96 and display 12, and provides a rigid structure for supporting the fore arm 96 when folded. A shoulder connecting tab 140 extending from one end of the upper arm center panel 128 is received in a shoulder slot 152 formed in the stand-up display 12 to attach the arm 14 to the display 12. The upper arm upper and lower slots 116, 112 are formed in the center panel 128 proximal the end opposite the shoulder connecting tab 134, and receive the tabs 110, 114 extending from the forearm 96. A locking tab 142 extending from an edge of one side panel 130 is received in a slot 146 formed in the crease 138 defining an edge of the other side panel 132 between the other side panel 132 and adjacent intermediate panel 136. An elbow connecting tab 148 formed in the other side panel 132 extends through a slot 150 formed in the one side panel 130, and is received in an elbow slot 156 formed in the display to attach the upper arm to the display 12.

Figure 12:
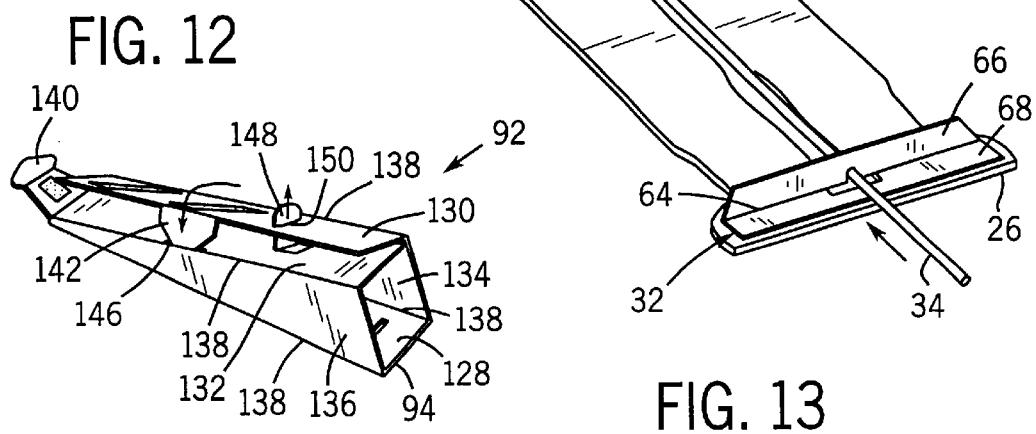
FIG. 12 is a perspective view of a partially assembled upper arm of FIG. 1.

Referring to FIG. 12, the upper arm 92 is assembled by folding the panels 128, 130, 132, 134, 136 at the creases 138, such that the side panels 132, 138 are in an overlapping relation. The elbow connecting tab 148 is slipped through slot 150. And the locking tab 142 is inserted into slot 146. The locking tab 142 locks the panels together to form the rigid structure.

Figure 14:
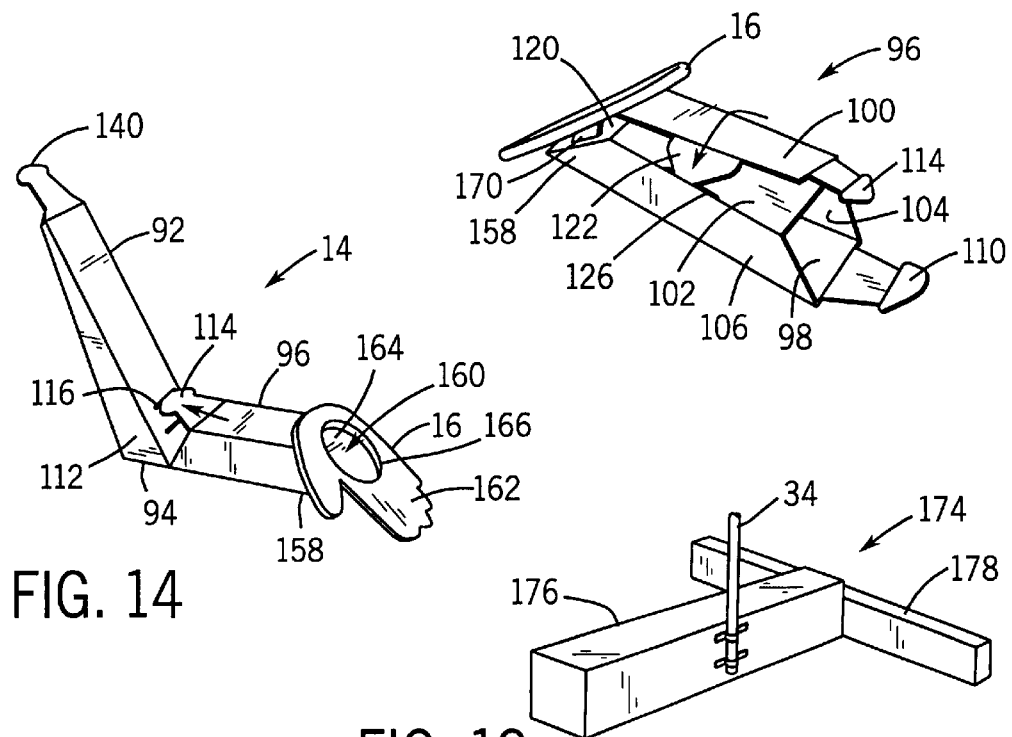
FIG. 14 is a top perspective view of a partially assembled arm of FIG. 1.

Referring to FIGS. 14 and 15, the fore arm 96 is joined to the upper arm 92 proximal the upper arm distal end 94 using the forearm tabs 110, 114. In particular, the fore arm upper connecting tab 114 is inserted into the upper arm upper slot 116, and then folded downwardly. The tip of the tab 114 is slipped through the upper arm lower slot 112 to lock it in place. The fore arm lower connecting tab 110 is folded around the end of the upper arm center panel 128, and the tip of the tab 110 is slipped through the upper arm lower slot 112 to lock it in place. The tabs 110, 114 lock the upper arm 92 and fore arm 96 together to form the arm 14.

Referring to FIG. 16, the arm 14 is attached to the display 12 by inserting the shoulder connecting tab 140 into the shoulder slot 152, and then folding the tab 140 downwardly to insert the tip of the tab 140 into the connecting tab locking slot 154 formed in the display 12 below the shoulder slot 154. The elbow connecting tab 148 extending from the upper arm 92 is then inserted into the elbow slot 156 formed in the display 12 to secure the distal end 94 of the upper arm 92 against the display 12. The elbow slot 156 is disposed below the shoulder slot 152 and locking slot 154. An adhesive, such as glue pads 172 (shown in FIG. 15), or other method of connecting disclosed above, can be applied to the exposed upper arm side panel 130 to further secure the arm 14 to the display 12.

Referring to FIGS. 9, 10, 13, and 14, the presentment platform 16 is attached to one of the flaps 118, 120 at the distal end 155 of the fore arm 96, and provides a horizontal surface for presenting food to the birds. An upwardly open receptacle 160 formed in the presentment platform 16 contains the bird food for presentment to the birds. Preferably, the platform 16 includes upper and lower members 162, 164, formed from rigid sheets, and cut out in the form of a human hand. The members 162, 164 are stacked such that the hand shapes are aligned, and joined together using methods, such as described above. The lower member 164 is attached to one of the forearm flaps 118, 120 using methods such as described above. Of course, the presentment platform can be formed using one or more members without departing from the scope of the present invention.

An aperture 166 is formed in the upper member 162, and in combination with the lower member 164 when the upper member 162 is joined to the lower member 164, forms the receptacle 160. Preferably, the aperture 166 is formed in the palm of the upper member hand shape to simulate the palm of a human. Most preferably, the upper member 162 is cut out of the same sheet of material as the display 12 to provide a relatively deep receptacle 160 of approximately 4 mm.

The presentment platform 16 is attached to the fore arm 96 by folding the fore arm flaps 118, 120 toward each other, and adhesively securing the flaps 118, 120 together to form a substantially horizontal surface. The presentment platform 16 is then adhesively attached to the horizontal surface, such as by sandwiching a glue pad 170 between the top flap 118 or 120 and the presentment platform 16. Of course, the methods of connecting such as described herein can be used to join the presentment platform 16 to the fore arm 96 without departing from the scope of the present invention.

Referring to FIGS. 1, 11, 17, and 18, the support member 34 engages the cross members 28, 30, 32 to support the trainer 10 in the standing position. Preferably, the support 34 is a pole, such as a ½ inch diameter pipe, inserted through the cross member apertures 36, 60, 62, and extends past the display feet 26 into the ground to anchor the trainer 10 in the standing position. A metal cap 168 (shown in FIG. 17) mounted to one end of the support 34 prevents damage to the support 34 when it is pounded into the ground using a tool, such as a hammer.

Figure 19:
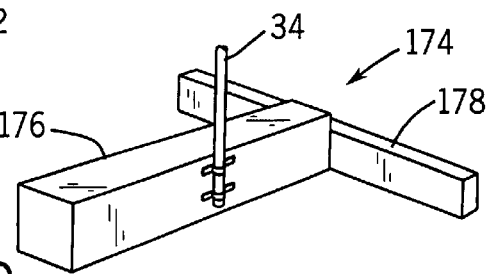
FIG. 19 is a base for supporting the support of FIG. 1.

The support 34 can be formed from a single piece, or two or more pieces to simplify shipping. If the support 34 is formed from two or more pieces, a joiner 170 (shown in FIG. 11) is provided to join the support pieces together to form a single elongated support. Of course, the support 34 can include a stand 174, such as shown in FIG. 19, having a base 176 connected to one end of the support 34, and crosspiece 178 for stability.

In use, referring to FIG. 11, the trainer 10 is assembled by unfolding the display 12 to full height, and laying the display 12 on a flat surface, such as the ground, such that the display back faces upwardly. The bottom and middle cross member panels 66, 54 having the apertures 60, 62 formed therein are folded 90° away from the display 12, and the top cross member 28 is bent at the creases and folded to form a rectangular box with the side panels 38, 46 in an overlapping relation. An adhesive, such as a glue tab, is sandwiched between the top cross member side panels 38, 46 to prevent the top cross member 28 from unfolding. The head support is secured in place by folding the head support support panel 76 90° away from the display 12, and then folding the bracing tab 90 over to lock the support panel 76 in place.

Once the display 12 is assembled, the arm 14 can be attached to the display 12 as discussed above. Preferably, however, the arm 14 is attached after erecting the display 12, and when the articles of clothing are placed on the display 12, as described below. Therefore, in accordance with the preferred embodiment, the display 12 is located in a desired location relative to an established bird feeding location, such as a bird feeder, and the support 34 is anchored to the ground, such that the display 12 is in a vertical position.

Preferably, the display 12 is anchored to the ground by laying the display 12 face down on the ground, such that the aperture 62 formed in the bottom cross member 32 is in the desired location for the trainer 10, and inserting an end of the support 34 through the bottom cross member aperture 62. The support 34 is held in a vertical position, and the support end inserted through the aperture 62 is urged into the ground approximately 10 inches deep by pounding on the support cap 168 attached to the opposing support end.

Preferably, if the support 34 is formed from two or more pieces, the support pieces should be assembled after anchoring the lower piece in the ground as described above. Of course, when anchoring a lower piece to the ground, the cap 168 should be mounted to the lower piece end not being anchored in the ground. The cap 168 is then removed prior to joining the support pieces together.

As shown in FIG. 17, once the support 34 is securely fixed in the ground and assembled if the support more than one piece, the display 12 is lifted up, and the support 34 is slipped through the middle and top cross member apertures 60, 36 to position the trainer 10 in the standing position. Once the display is in position, the arm 14 is attached and one or more articles of clothing, such as a hat, jacket, shirt, sweat shirt, and the like, is placed on the assembled trainer 14. Preferably, the arm 14 is inserted into a sleeve of one of the articles of clothing, and then attached to the display 12 as described above.

After clothing the trainer 10 and attaching the arm 14, the presentment platform 16 is attached to the fore arm 92 as described above. A platform support (not shown) can be provided to further support the presentment platform 16 if the arm 14 cannot support the weight of the birds and the bird food. The platform support, such as a pole, has one end engaging the presentment platform 16 or fore arm 92, and an opposing end engaging the ground underneath the presentment platform 16.

Once the trainer is initially positioned, assembled, and clothed, it is ready for training birds. When training the birds, the assembled and clothed trainer 10 is moved within the area of the established bird feeding location to desensitize the birds to the trainer 10, and the clothes, such that the birds will eventually retrieve food from an individual wearing the same clothes. The area of an established bird feeding location can include, but is not limited to an area within a 25 foot radius of the established bird feeding location. Starting the training too close to the feeding location can scare the birds away from the feeding location. Therefore, for best results, the initial placement of the trainer 10 should be at least twenty feet away from the feeding location.

Over a period of days, the trainer 10 is moved closer to the feeding location to allow the feeding birds to become accustomed to the trainer 10 and clothing. Preferably, the trainer 10 is positioned in at least three different locations within the area of the established bird feeding location, and remains in each location at least two or three days before being repositioned. Most preferably, the trainer 10 is moved progressively closer to the feeding location over a period of two or more weeks.

Once the trainer 10 is within a few feet of the feeding location, bird food is placed in the receptacle of the presentment platform 16 for retrieval by the birds. Preferably, the feed is placed in the receptacle 160 only one or two days prior to substituting the trainer 10 with a user to prevent other animals, such as squirrels, from climbing the trainer 10, and taking the food.

After a day or two of presenting food to the birds, the birds become accustomed to the articles of clothing and taking food out of the palm of the presentment platform hand shape. Once the birds are trained to accept the food, from the trainer, the trainer 10 is removed, and the user puts on the clothes which were on the trainer 10. The user then stands in the last location of the trainer 10, and extends their hand containing bird food in approximately the same position as the presentment platform 16.

The birds will proceed to take food from the user's hand because they have been trained to retrieve food from the trainer 10 wearing the same clothes. Initially, the user should remain as motionless as possible to emulate the trainer. However, after a period of time, the birds will not be bothered by human movement, and may follow the user around looking for food regardless of the clothing worn by the user.

While there has been shown and described what are at present considered to be the preferred embodiments of the invention, it will be obvious to the those skilled in the art that various changes and modifications can be made to the described device without departing from the scope of the present invention. Accordingly, to ascertain the full scope of the invention, reference must be had to the following claims. For example, the preferred embodiment is directed to training birds. However, the method an apparatus can be used to train other non-domesticated animals, such as squirrels, chipmunks, and the like.

What is claimed is:

1. A bird feeding trainer, comprising:
   a display for supporting an article of clothing;
   an arm extending from said display, and having a distal end;
   a horizontal presentment platform mounted to said distal end for presenting food to a bird.

2. The bird feeding trainer of claim 1, in which said display is formed from a sheet material, and includes a head, shoulders, and feet.

3. The bird feeding trainer of claim 2, including an image of a face applied to said head.

4. The bird feeding trainer of claim 1, in which said arm is formed from an upper arm attached to said display and a forearm attached to a distal end of said upper arm.

5. The bird feeding trainer of claim 1, in which said arm is formed from a sheet material.

6. The bird feeding trainer as in claim 1, in which said presentment platform includes a receptacle for containing bird food.

7. A method of training a bird to eat out of a hand of a user, said method comprising:

presenting food for a bird in a bird feeding trainer having an article of clothing attached thereto until birds accept feed from said trainer;

removing said article of clothing from said trainer, wrapping said clothing on a user; and presenting food for the birds in a hand of the user while said user is wearing said clothing.

8. The method of claim 7, including positioning said trainer in an area of an established bird feeding location prior to presenting ford for a bird in the bird feeding trainer.

9. The method of claim 8, including progressively moving said trainer closer to said established bird feeding location prior to presenting food for a bird in the bird feeding trainer.

10. An animal feeding trainer, comprising:

a display for supporting an article of clothing;

an arm extending from said display, and having a distal end;

a horizontal presentment platform mounted to said distal end for presenting food to an animal.

11. The animal feeding trainer of claim 10, in which said display is formed from a sheet material, and includes a head, shoulders, and feet.

12. The animal feeding trainer of claim 11, including an image of a face applied to said head.

* * * * *